(12) United States Patent
Cao et al.

(10) Patent No.: US 11,635,649 B2
(45) Date of Patent: Apr. 25, 2023

(54) DISPLAY PANEL, MANUFACTURING METHOD THEREOF AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Wei Cao, Beijing (CN); Yupeng Wang, Beijing (CN); Jianjun Wang, Beijing (CN); Jiliang Zhang, Beijing (CN); Yuting He, Beijing (CN); Bingyue Wang, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/852,305

(22) Filed: Jun. 28, 2022

(65) Prior Publication Data
US 2022/0326564 A1  Oct. 13, 2022

Related U.S. Application Data

(63) Continuation of application No. 17/359,401, filed on Jun. 25, 2021, now Pat. No. 11,391,980.

(30) Foreign Application Priority Data

Aug. 31, 2020 (CN) .......................... 202010900467.7

(51) Int. Cl.
 *G02F 1/1333* (2006.01)
 *G02F 1/1339* (2006.01)
 *G02F 1/1335* (2006.01)

(52) U.S. Cl.
 CPC .... *G02F 1/133388* (2021.01); *G02F 1/13396* (2021.01); *G02F 1/133308* (2013.01);
 (Continued)

(58) Field of Classification Search
 None
 See application file for complete search history.

(56) References Cited

U.S. PATENT DOCUMENTS

2013/0050619 A1  2/2013  Kim
2016/0291374 A1  10/2016  Fan et al.

FOREIGN PATENT DOCUMENTS

| CN | 105489124 A | 4/2016 |
| CN | 205139519 U | 4/2016 |
| CN | 208834057 U | 5/2019 |

OTHER PUBLICATIONS

USPTO. First Office Action dated Dec. 7, 2021 for U.S. Appl. No. 17/359,401.
(Continued)

*Primary Examiner* — Phu Vu
(74) *Attorney, Agent, or Firm* — Houtteman Law LLC

(57) ABSTRACT

A display panel, a manufacturing method thereof and a display device are provided. The display panel includes a display area and a frame area surrounding the display area, and includes an array substrate and a color filter substrate. The color filter substrate includes a substrate, first support structures in the display area and second support structures in the frame area; each first support structure includes a first main support part in contact with the array substrate and a first auxiliary support part having a first gap with the array substrate; each second support structure includes a second main support part in contact with the array substrate and a second auxiliary support part having a second gap with the array substrate; and a thickness of the first auxiliary support
(Continued)

part is greater than a thickness of the second auxiliary support part.

20 Claims, 5 Drawing Sheets

(52) U.S. Cl.
CPC .. *G02F 1/133512* (2013.01); *G02F 1/133514* (2013.01); *G02F 1/133516* (2013.01)

(56) References Cited

OTHER PUBLICATIONS

USPTO, Notice of allowance dated Mar. 21, 2022 for U.S. Appl. No. 17/359,401.
USPTO, Corrected Notice of allowance dated Apr. 15, 2022 for U.S. Appl. No. 17/359,401.
USPTO, Corrected Notice of allowance dated Apr. 26, 2022 for U.S. Appl. No. 17/359,401.
China Patent Office, First Office Action dated Dec. 12, 2022 for application No. CN202010900467.7.

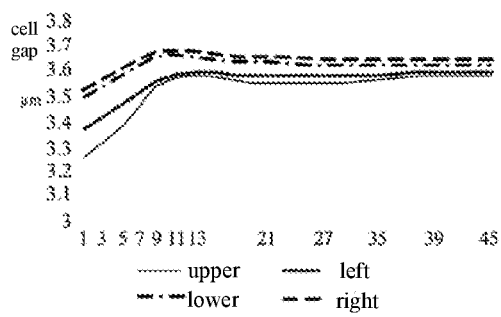
FIG. 7
| difference | upper | left | lower | right |
|---|---|---|---|---|
| maximum value-minimum value | 0.171 | 0.351 | 0.154 | 0.234 |
FIG. 8
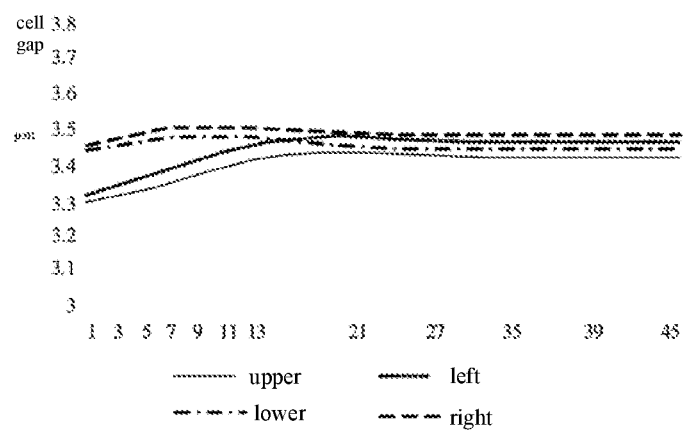
FIG. 9
| difference | upper | left | lower | right |
|---|---|---|---|---|
| maximum value-minimum value | 0.143 | 0.123 | 0.037 | 0.056 |
FIG. 10

DISPLAY PANEL, MANUFACTURING METHOD THEREOF AND DISPLAY DEVICE

CROSS-REFERENCE TO RELATED APPLICATION

This application is a continuation application of U.S. patent application Ser. No. 17/359,401, filed on Jun. 25, 2021, which claims priority to Chinese Patent Application No. 202010900467.7, filed on Aug. 31, 2020, the entire contents of which are hereby incorporated by reference.

TECHNICAL FIELD

The present disclosure relates to the field of display technology, in particular to a display panel, a manufacturing method thereof and a display device.

BACKGROUND

A liquid crystal display (LCD) is formed by assembling an upper substrate and a lower substrate, a cell gap between the upper substrate and the lower substrate is filled with liquid crystal, and spacers are arranged between the upper substrate and the lower substrate to support the two substrates. Because a spacer in the display area of the liquid crystal display and a spacer in the frame area surrounding the display area provide different support strengths (the support strength from the spacer in the display area is higher, and the support strength from the spacer in the frame area is lower), a seesaw effect is generated under the influence of air pressure in the processes of vacuum assembly and cutting of the upper and lower substrates, which causes abnormal cell gap in the frame area, and leads to undesirable effects of the liquid crystal display such as shining at four sides during low-grayscale display.

SUMMARY

In one aspect, embodiments of the present disclosure provides a display panel, including a display area and a frame area surrounding the display area, wherein the display panel includes an array substrate and a color filter substrate that are assembled, the color filter substrate includes a substrate, and a plurality of first support structures and a plurality of second support structures both disposed on a side of the substrate close to the array substrate, the plurality of first support structures are in the display area, and the plurality of second support structures are in the frame area; at least a part of each of the plurality of first support structures is in contact with the array substrate, and at least a part of each of the plurality of second support structures is in contact with the array substrate.

In some embodiments, the color filter substrate further includes a first film structure and a second film structure, the first film structure is in the display area and disposed between the substrate and the plurality of first support structures; the second film structure is in the frame area and disposed between the substrate and the plurality of second support structures;

the first film structure includes a first black matrix and a first color resist layer, and the first black matrix and the first color resist layer are sequentially stacked in a direction away from the substrate;

the second film structure includes a second black matrix and a second color resist layer, and the second black matrix and the second color resist layer are sequentially stacked in the direction away from the substrate; and the first black matrix and the second black matrix are made of a same material and arranged in a same layer, and the first color resist layer and the second color resist layer are arranged in a same layer.

In some embodiments, each of the plurality of first support structures includes a first main support part and a first auxiliary support part, and the first main support part and the first auxiliary support part are both arranged on a surface of the first color resist layer away from the substrate;

the first main support part is in contact with a first surface layer of the array substrate, and the first auxiliary support part is opposite to the first surface layer of the array substrate with a first gap therebetween;

each of the plurality of second support structures includes a second main support part and a second auxiliary support part, and the second main support part and the second auxiliary support part are both arranged on a surface of the second color resist layer away from the substrate; and the second main support part is in contact with a second surface layer of the array substrate, and the second auxiliary support part is opposite to the second surface layer of the array substrate with the first gap therebetween.

In some embodiments, the first black matrix and the second black matrix have a same thickness, and a thickness of the second color resist layer is greater than a thickness of the first color resist layer.

In some embodiments, the first surface layer in contact with the first main support part and the second surface layer in contact with the second main support part have a same height.

In some embodiments, a difference between thicknesses of the first main support part and the second main support part is equal to a difference between the thicknesses of the second color resist layer and the first color resist layer.

In some embodiments, a difference between thicknesses of the first auxiliary support part and the second auxiliary support part is equal to the difference between the thicknesses of the second color resist layer and the first color resist layer.

In some embodiments, at least one of the second surface layers respectively in contact with the plurality of second main support parts has a height greater than a height of the first surface layer in contact with the first main support part.

In some embodiments, there is a first difference in height between the at least one of the second surface layers respectively in contact with the plurality of second main support parts and the first surface layer in contact with the first main support part; a difference in thickness between each second main support part in contact with one of the at least one of the second surface layers and the first main support part is equal to a sum of a difference in thickness between the second color resist layer and the first color resist layer and the first difference in height.

In some embodiments, a difference in thickness between each second auxiliary support part opposite to one of the at least one of the second surface layers and the first auxiliary support part is equal to the sum of the difference in thickness between the second color resist layer and the first color resist layer and the first difference in height.

In some embodiments, the height of each second surface layer in contact with the second main support part is greater than the height of the first surface layer in contact with the first main support part.

In some embodiments, there is a first difference in height between the second surface layer in contact with the second main support part and the first surface layer in contact with the first main support part; a difference in thickness between the second main support part and the first main support part is equal to a sum of a difference in thickness between the second color resist layer and the first color resist layer and the first difference in height.

In some embodiments, a difference in thickness between the second auxiliary support part and the first auxiliary support part is equal to the sum of the difference in thickness between the second color resist layer and the first color resist layer and the first difference in height.

In some embodiments, the first main support parts and the second main support parts have a same distribution density; and/or the first auxiliary support parts and the second auxiliary support parts have a same distribution density.

In another aspect, embodiments of the present disclosure provide a display device, including any one of the display panels described above.

In another aspect, embodiments of the present disclosure provides a manufacturing method of a display panel, the display panel including a display area and a frame area surrounding the display area, the manufacturing method includes manufacturing an array substrate and a color filter substrate separately, and assembling the array substrate and the color filter substrate;

manufacturing the color filter substrate includes: forming a plurality of first support structures and a plurality of second support structures on a substrate, wherein the plurality of first support structures and the plurality of second support structures are formed on a side of the substrate close to the array substrate; the plurality of first support structures are located in the display area, and the plurality of second support structures are located in the frame area; at least a part of each of the plurality of first support structures is in contact with the array substrate, and at least a part of each of the plurality of second support structures is in contact with the array substrate.

In some embodiments, manufacturing the color filter substrate further includes forming a first film structure and a second film structure, wherein the first film structure is located in the display area and is formed on the substrate before the plurality of first support structures are formed; the second film structure is located in the frame area and is formed on the substrate before the plurality of second support structures are formed;

forming the first film structure includes sequentially forming a first black matrix and a first color resist layer on the substrate, wherein the first black matrix and the first color resist layer are sequentially stacked in a direction away from the substrate;

forming the second film structure includes sequentially forming a second black matrix and a second color resist layer on the substrate, wherein the second black matrix and the second color resist layer are sequentially stacked in the direction away from the substrate;

the first black matrix and the second black matrix are formed by one photolithography process; color resists of a same color in the first color resist layer and the second color resist layer are formed by a same coating process; a thickness of the second color resist layer is greater than a thickness of the first color resist layer.

In some embodiments, forming the plurality of first support structures includes forming a plurality of first main support parts and a plurality of first auxiliary support parts; the plurality of first main support parts and the plurality of first auxiliary support parts are arranged on a surface of the first color resist layer away from the substrate;

each of the plurality of first main support parts is in contact with a first surface layer of the array substrate, and each of the plurality of first auxiliary support parts is opposite to the first surface layer of the array substrate with a first gap therebetween;

forming the plurality of second support structures includes forming a plurality of second main support parts and a plurality of second auxiliary support parts; the plurality of second main support parts and the plurality of second auxiliary support parts are arranged on a surface of the second color resist layer away from the substrate; and each of the plurality of second main support parts is in contact with a second surface layer of the array substrate, and each of the plurality of second auxiliary support parts is opposite to the second surface layer of the array substrate with the first gap therebetween.

In some embodiments, the plurality of first main support parts, the plurality of first auxiliary support parts, the plurality of second main support parts, and the plurality of second auxiliary support parts are formed through one exposure process using a half-tone mask.

In some embodiments, the display panel further includes a to-be-cut area, the to-be-cut area is on a side of the frame area away from the display area, and is located on at least one side of the display panel; manufacturing the color filter substrate further includes: sequentially forming a third film structure and a third auxiliary support part on the substrate, wherein the third film structure and the third auxiliary support part are located in the to-be-cut area, and forming the third film structure includes sequentially forming a third black matrix and a third color resist layer on the substrate, the third black matrix and the third color resist layer being stacked in a direction away from the substrate, the method further includes, after the array substrate and the color filter substrate are assembled, removing the to-be-cut area on the color filter substrate by cutting, and keeping the to-be-cut area on the array substrate.

BRIEF DESCRIPTION OF THE DRAWINGS

FIG. 7 is a schematic diagram illustrating a variation of a cell gap between a color filter substrate and an array substrate in each of upper, lower, left, and right edge regions of a conventional LCD panel;

FIG. 8 is a diagram illustrating a difference between a maximum value and a minimum value of the cell gap between the color filter substrate and the array substrate in each of upper, lower, left, and right edge regions of the conventional LCD panel;

FIG. 9 is a schematic diagram illustrating a variation of a cell gap between a color filter substrate and an array substrate in each of upper, lower, left, and right edge regions of a display panel according to an embodiment of the present disclosure; and FIG. 10 is a diagram illustrating a difference between a maximum value and a minimum value of the cell gap between the color filter substrate and the array substrate in each of upper, lower, left, and right edge regions of the display panel according to the embodiment of the present disclosure.

DETAILED DESCRIPTION

In order to make those skilled in the art better understand the technical solutions of the present disclosure, a display panel and a manufacturing method thereof, and a display device according to the present disclosure are described in detail below with reference to the accompanying drawings and the specific embodiments.

Figure 1:
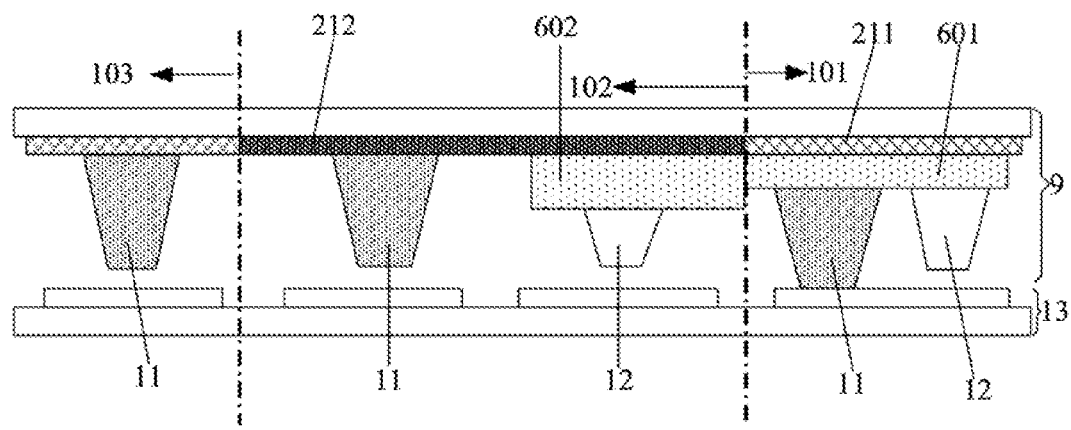
FIG. 1 is a schematic cross-sectional view of a structure of a display panel in the related art.
Figure 2:
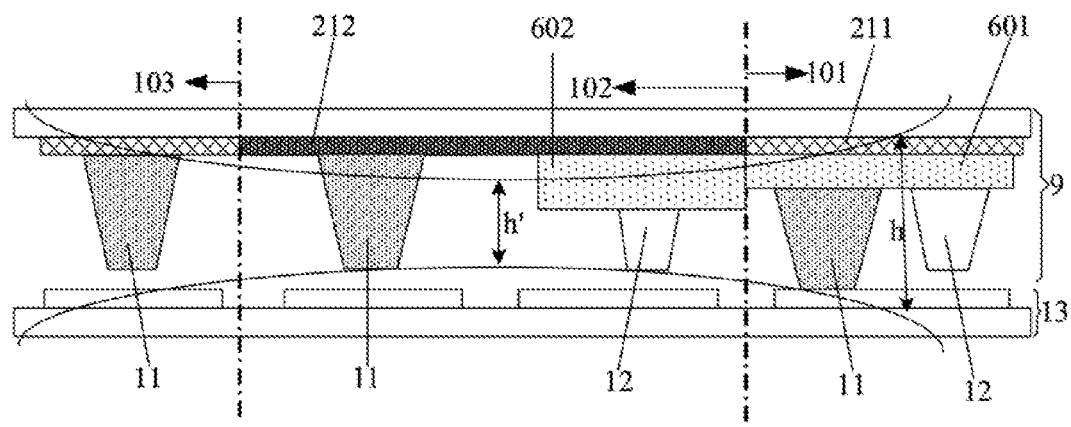
FIG. 2 is a schematic diagram illustrating a seesaw effect that occurs in a process of vacuum assembly or cutting of the color filter substrate and the array substrate in FIG. 1.

A liquid crystal display panel is formed by assembling a color filter substrate and an array substrate, and liquid crystal is filled in a cell gap between the color filter substrate and the array substrate. Spacers are disposed between the color filter substrate and the array substrate to support the two substrates that are assembled. The display panel has a good display effect under the condition that the cell gap between the color filter substrate and the array substrate is uniform, and display defects of the display panel may occur when the cell gap between the color filter substrate and the array substrate is not uniform. For example, when the cell gap in the display area of the display panel and the cell gap in the peripheral frame area of the display panel are not uniform, the display panel may have a shiny phenomenon at the peripheral frame area when displaying a low-grayscale picture, and this problem is more serious for a liquid crystal display product with a larger frame area. As shown in FIG. 1, a conventional liquid crystal display panel includes a display area 101 and a frame area 102 surrounding the display area 101. The display area is used for displaying pictures, and the frame area is used for arranging driving circuits (e.g., a source driving circuit, a gate driving circuit, etc.) and wiring. In the display area 101, the color filter substrate 9 includes a first black matrix 211, a first color resist layer 601 disposed on the first black matrix 211, and a main spacer 11 and an auxiliary spacer 12 disposed on the first color resist layer 601. In the frame area 102, the color filter substrate 9 includes a second black matrix 212 and a main spacer 11 disposed on the second black matrix 212, or includes a second black matrix 212, a second color resist layer 602 disposed on the second black matrix 212, and an auxiliary spacer 12 disposed on the second color resist layer 602. Alternatively, as shown in FIG. 1, in the frame area 102, a portion of the color filter substrate 9 away from the display area 101 includes a second black matrix 212 and a main spacer 11 disposed on the second black matrix 212, and a portion of the color filter substrate 9 close to the display area 101 includes the second black matrix 212, a second color resist layer 602 disposed on the second black matrix 212, and an auxiliary spacer 12 disposed on the second color resist layer 602. Because part of the frame area 102 is not provided with a color resist layer and/or is provided with only the auxiliary spacer 12, the spacer in the frame area 102 is farther away from the array substrate 13, and the spacer cannot contact with the array substrate 13, so that the support from the spacer in the frame area 102 to the two substrates is weaker than that from the spacer in the display area 101. Therefore, when the color filter substrate 9 and the array substrate 13 are vacuum-assembled and a liquid crystal display panel is cut from a mother substrate, a seesaw effect is likely to occur to the display panel, so that there is a difference between a cell gap h in the display area 101 and a cell gap h' in the frame area 102, as shown in FIG. 2, which causes poor image display.

Figure 3A:
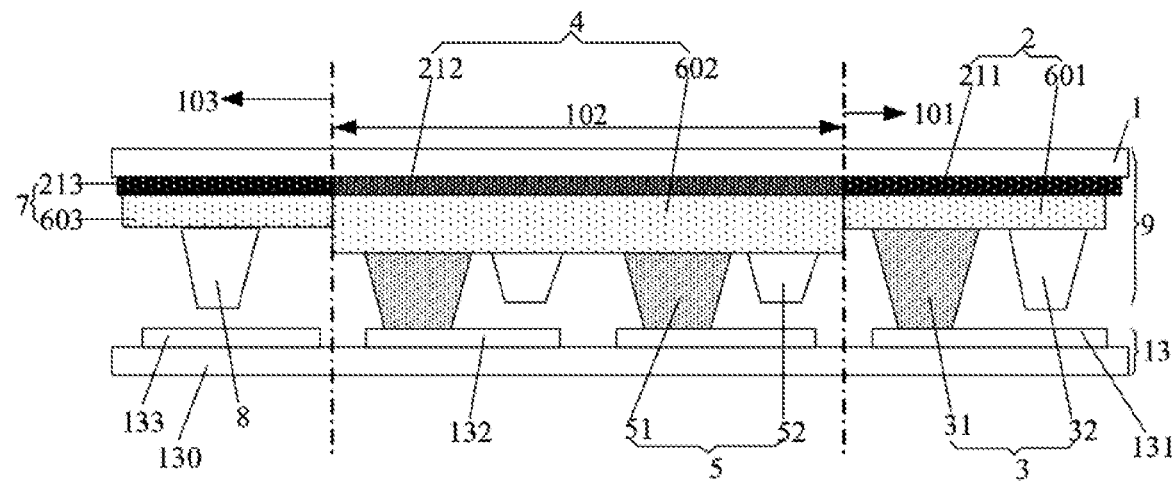
FIG. 3a is a schematic cross-sectional view of a structure of a display panel according to an embodiment of the present disclosure.
Figure 3B:
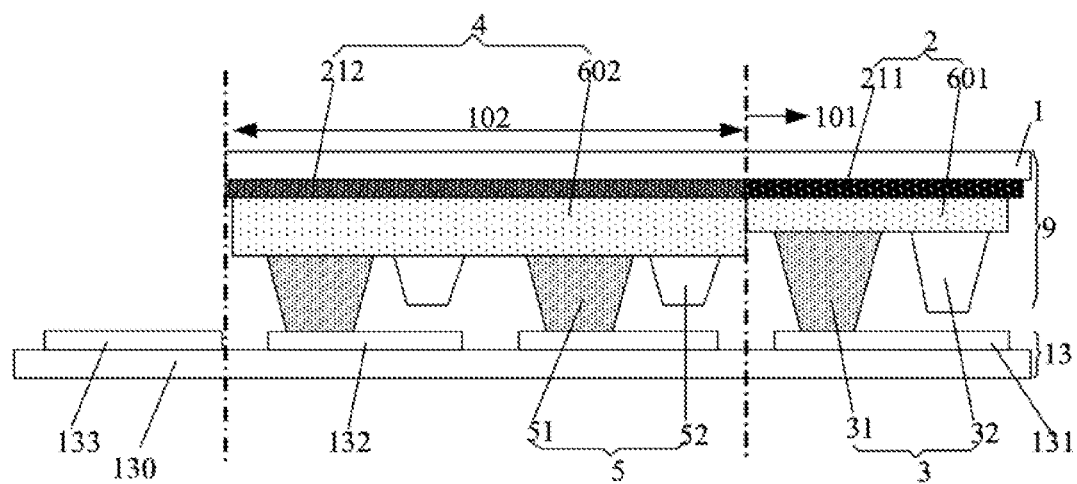
FIG. 3b is a schematic cross-sectional view of a structure of the display panel in FIG. 3a after a to-be-cut area on a color filter substrate is cut.

In view of the problem of poor display of the liquid crystal display panel caused by uneven cell gap, embodiments of the present disclosure provide a display panel, as shown in FIGS. 3a and 3b, including a display area 101 and a frame area 102 surrounding the display area 101. The display panel includes an array substrate 13 and a color filter substrate 9, the array substrate 13 and the color filter substrate 9 are arranged opposite to each other, the color filter substrate 9 includes a substrate 1 and a plurality of first support structures 3 and a plurality of second support structures 5 arranged on a side of the substrate 1 close to the array substrate 13, the plurality of first support structures 3 are located in the display area 101, and the plurality of second support structures 5 are located in the frame area 102; at least a part of each of the plurality of first support structures 3 is in contact with the array substrate 13, and at least a part of each of the plurality of second support structures 5 is in contact with the array substrate 13.

The color filter substrate 9 and the array substrate 13 are disposed opposite to each other, and at least a cell gap in the display area 101 is filled with liquid crystal, so as to realize a display function of the liquid crystal display panel. The plurality of first support structures 3 can provide support to the color filter substrate 9 and the array substrate 13 in the display area 101; the plurality of second support structures 5 can provide support to the color filter substrate 9 and the array substrate 13 in the frame area 102. The first support structure 3 generally includes a main support structure in contact with the array substrate 13 and an auxiliary support structure not in contact with the array substrate 13; at least a part of each first support structure 3 in contact with the array substrate 13 refers to the main support structure. Similarly, the second support structure 5 generally includes a main support structure in contact with the array substrate 13 and an auxiliary support structure not in contact with the array substrate 13; at least a part of each second support structure 5 in contact with the array substrate 13 refers to as the main support structure.

By making at least a part of the second support structure 5 contact with the array substrate 13, the support from the second support structure 5 to the color filter substrate 9 and the array substrate 13 in the frame area 102 is basically consistent with the support from the first support structure 3 to the color filter substrate 9 and the array substrate 13 in the display area 101, so that a seesaw effect generated during the vacuum assembly and cutting of the color filter substrate 9 and the array substrate 13 is alleviated or avoided, the influence caused by a difference in cell gap between the display area 101 and the frame area 102 of the display panel is reduced or avoided, the display defect of the display panel is further alleviated or avoided, and the display effect of the display panel is improved.

In some embodiments, the color filter substrate 9 further includes a first film structure 2 and a second film structure 4, the first film structure 2 is located in the display area 101, and the first film structure 2 is disposed between the substrate 1 and the first support structures 3; the second film structure 4 is located in the frame area 102, and the second film structure 4 is disposed between the substrate 1 and the second support structures 5. The first film structure 2 includes a first black matrix 211 and a first color resist layer 601, and the first black matrix 211 and the first color resist layer 601 are sequentially stacked in a direction away from the substrate 1; the second film structure 4 includes a second black matrix 212 and a second color resist layer 602, and the second black matrix 212 and the second color resist layer 602 are sequentially stacked in the direction away from the substrate 1. The first black matrix 211 and the second black matrix 212 are made of the same material and are arranged in a same layer, and the second color resist layer 602 and the first color resist layer 601 are arranged in a same layer.

It should be noted that the expression "A and B are arranged in a same layer" in the present disclosure means that A and B may be formed simultaneously by one patterning process, or A and B are located at substantially the same level.

In some embodiments, the first support structure 3 includes a first main support part 31 and a first auxiliary support part 32, and both the first main support part 31 and the first auxiliary support part 32 are disposed on a surface of the first color resist layer 601 facing away from the substrate 1; the first main support part 31 is in contact with a first surface layer 131 of the array substrate 13, and the first auxiliary support part 32 and the first surface layer 131 of the array substrate 13 are opposite to each other with a first gap therebetween (the first auxiliary support part 32 is not in contact with the first surface layer 131). The second support structure 5 includes a second main support part 51 and a second auxiliary support part 52, and the second main support part 51 and the second auxiliary support part 52 are both disposed on a surface of the second color resist layer 602 facing away from the substrate 1; the second main support part 51 is in contact with a second surface layer 132 of the array substrate 13, and the second auxiliary support part 52 and the second surface layer 132 of the array substrate 13 are opposite to each other with a second gap therebetween (the second auxiliary support part 52 is not in contact with the second surface layer 132). The first surface layer 131 is a functional layer that is disposed in the display area 101 of the array substrate 13 and is closest to the color filter substrate 9 (i.e., an uppermost functional layer in a direction perpendicular to the array substrate 13 and pointing from the array substrate 13 to the color filter substrate 9); the second surface layer 132 is a functional layer disposed in the frame area 102 of the array substrate 13 and closest to the color filter substrate 9 (i.e., an uppermost functional layer in the direction perpendicular to the array substrate 13 and pointing from the array substrate 13 to the color filter substrate 9). In this case, the first auxiliary support part 32 provide an auxiliary support to the color filter substrate 9 and the array substrate 13 in the display area 101, and the second auxiliary support part 52 provides an auxiliary support to the color filter substrate 9 and the array substrate 13 in the frame area 102. With the arrangement that the first gap is between the first auxiliary support part 32 and the array substrate 13, the second gap is between the second auxiliary support part 52 and the array substrate 13, and the first main support part 31 and the second main support part 51 are respectively in contact with the array substrate 13, it can be ensured that the support structures in the display area 101 and the frame area 102 are basically the same, so as to alleviate or avoid a seesaw effect occurring in the case of vacuum assembly and cutting of the color filter substrate 9 and the array substrate 13, and reduce or eliminate the influence caused by a difference between the cell gap between the color filter substrate 9 and the array substrate 13 in the display area 101 and the cell gap between the color filter substrate 9 and the array substrate 13 in the frame area 102.

It can be understood that a plurality of first main support parts 31, a plurality of first auxiliary support parts 32, a plurality of second main support parts 51, and a plurality of second auxiliary support parts 52 are provided.

When the array substrate 13 and the color filter substrate 9 are assembled and no external force is applied, only the first main support part 31 and the second main support part 51 are in contact with the array substrate 13, so as to achieve the supporting function, and the first auxiliary support part 32 and the second auxiliary support part 52 are not in contact with the array substrate 13. The first main support part 31, the first auxiliary support part 32, the second main support part 51, and the second auxiliary support part 52 are all made of an elastic material, and when the first main support part 31 and the second main support part 51 are compressed to a certain degree, the first auxiliary support part 32 and the second auxiliary support part 52 may come into contact with the array substrate 13, thereby achieving an auxiliary supporting function. Therefore, the first and second auxiliary support parts 32 and 52 serve to provide auxiliary support when the cell gap becomes small or a certain external pressure is applied. Of course, the applied external force is limited, otherwise the support part being elastically deformed may not be restored. Generally, the difference in thickness between the first main support part 31 and the first auxiliary support part 32, and the difference in thickness between the second main support part 51 and the second auxiliary support part 52 may be set according to the actual requirement of the product, and is generally from 0.45 μm to 0.55 μm.

In some embodiments, the first black matrix 211 has the same thickness as the second black matrix 212.

In some embodiments, the thickness of the second color resist layer 602 is greater than the thickness of the first color resist layer 601.

In some embodiments, the first surface layer 131 in contact with the first main support part 31 and the second surface layer 132 in contact with the second main support part 51 have the same height. The height of the first surface layer 131 is defined as a distance from a surface of the first surface layer 131 close to the color filter substrate 9 to a surface of the substrate 130 of the array substrate 13 close to the color filter substrate 9; the height of the second surface layer 132 is defined as a distance from a surface of the second surface layer 132 close to the color filter substrate 9 to the surface of the substrate 130 of the array substrate 13 close to the color filter substrate 9.

It can be understood that, in a case where the first black matrix 211 and the second black matrix 212 have the same thickness, the second color resist layer 602 has a thickness greater than that of the first color resist layer 601, the first surface layer 131 in contact with the first main support part 31 and the second surface layer 132 in contact with the second main support part 51 have the same height, and the thickness of the second main support part 51 is smaller than that of the first main support part 31. In some embodiments, the thickness of the second auxiliary support part 52 is smaller than the thickness of the first auxiliary support part 32.

In some embodiments, a same coating process may be used to form color resists of one color of the first color resist layer 601 and the second color resist layer 602. When a same coating process is used in the process of forming the first color resist layer 601 and the second color resist layer 602, since the frame area 102 needs to be completely covered by the second black matrix 212, the second black matrix 212 in the frame area 102 is in a whole surface shape (i.e., formed throughout the entire frame area 102), and the first black matrix 211 in the display area 101 only needs to cover the wiring area around a sub-pixel, so the first black matrix 211 of the display area 101 is in a matrix shape, and the black matrix in the whole surface shape and the black matrix in the matrix shape cause a difference in fluidity between the color resist layers in the frame area 102 and the display area 101, resulting in that the color resist layer in the frame area 102 is thicker than the color resist layer of the display area 101. Therefore, the thickness of the color resist layer in contact with the second support structure 5 is larger than the thickness of the color resist layer in contact with the first support structure 3. By making the thickness of the second main support part 51 smaller than the thickness of the first main support part 31 and the thickness of the second auxiliary support part 52 smaller than the thickness of the first auxiliary support part 32, the difference in thickness between the second color resist layer 602 and the first color resist layer 601 can be partially or completely compensated for, so that the difference between the sum of the thicknesses of the first black matrix 211, the first color resist layer 601 and the first main support part 31 in the display area 101 and the sum of the thicknesses of the second black matrix 212, the second color resist layer 602 and the second main support part 51 in the frame area 102 is reduced, the seesaw effect generated in the vacuum assembly and cutting of the color filter substrate 9 and the array substrate 13 is further reduced, and the influence caused by the difference in cell gap between the display area 101 and the frame area 102 of the color filter substrate 9 and the array substrate 13 that are assembled is reduced.

Further, in some embodiments, the difference in thickness between the first main support part 31 and the second main support part 51 is equal to the difference in thickness between the second color resist layer 602 and the first color resist layer 601. With this arrangement, the difference in thickness between the second color resist layer 602 and the first color resist layer 601 can be completely compensated for, so that the support from the second main support part 51 to the color filter substrate 9 and the array substrate 13 in the frame area 102 can be substantially the same as the support from the first main support part 31 to the color filter substrate 9 and the array substrate 13 in the display area 101. In this case, the sum of the thicknesses of the first black matrix 211, the first color resist layer 601 and the first main support part 31 in the display area 101 is the same as the sum of the thicknesses of the second black matrix 212, the second color resist layer 602 and the second main support part 51 in the frame area 102, so that both the first main support part 31 and the second main support part 51 can be in contact with the array substrate 13, thereby alleviating or avoiding the seesaw effect occurring in the vacuum assembly and cutting of the color filter substrate 9 and the array substrate 13, and eliminating an influence of the difference in cell gap between the display area 101 and the frame area 102 of the color filter substrate 9 and the array substrate 13 that are assembled.

In some embodiments, the difference in thickness between the first auxiliary support part 32 and the second auxiliary support part 52 is equal to the difference in thickness between the second color resist layer 602 and the first color resist layer 601. With this arrangement, the difference in thickness between the second color resist layer 602 and the first color resist layer 601 can be completely compensated for, so that the support of the second auxiliary support part 52 to the color filter substrate 9 and the array substrate 13 in the frame area 102 is kept the same as the support of the first auxiliary support part 32 to the color filter substrate 9 and the array substrate 13 in the display area 101, thereby reducing or avoiding the seesaw effect occurring in the vacuum assembly and cutting of the color filter substrate 9 and the array substrate 13, and eliminating an influence caused by a difference in cell gap between the display area 101 and the frame area 102 of the color filter substrate 9 and the array substrate 13 that are assembled.

The difference in thickness between the second color resist layer 602 and the first color resist layer 601 may vary according to the size of the display panel. The size of the display panel may refer to the length of a diagonal line of the display area of the display panel. For example: when the size of the display panel is 21.5 inches, the difference in thickness between the second color resist layer 602 and the first color resist layer 601 may be 0.31 μm; when the size of the display panel is 22 inches, the difference in thickness between the second color resist layer 602 and the first color resist layer 601 may be 0.24 μm; when the size of the display panel is 23.6 inches, the difference in thickness between the second color resist layer 602 and the first color resist layer 601 may be 0.25 μm. It can be understood that the difference in thickness between the second color resist layer 602 and the first color resist layer 601 may not be limited to the above examples, and may be obtained by actual measurements.

Figure 5:
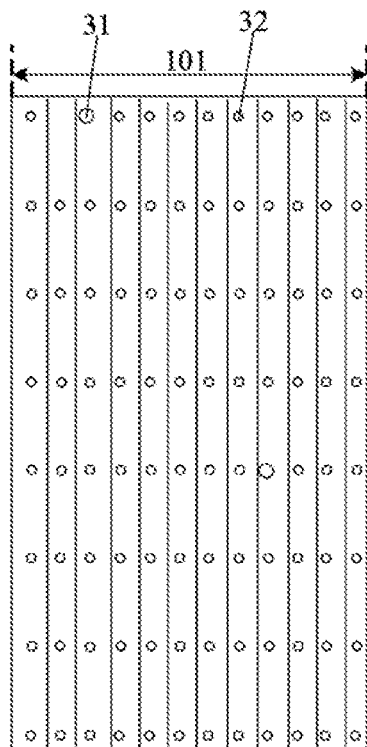
FIG. 5 is a schematic diagram illustrating distribution of first support structures in a display area according to an embodiment of the present disclosure.
Figure 6:
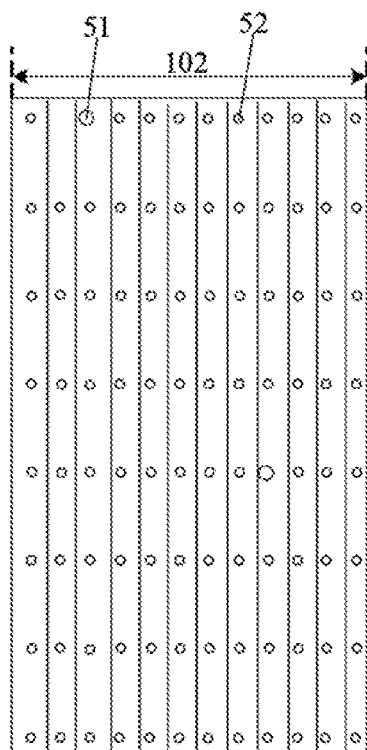
FIG. 6 is a schematic diagram illustrating distribution of second support structures in a frame area according to an embodiment of the present disclosure.

In some embodiments, as shown in FIGS. 5 and 6, the plurality of first main support parts 31 and the plurality of second main support parts 51 have the same distribution. The plurality of first auxiliary support parts 32 are distributed in the same manner as the plurality of second auxiliary support parts 52. That is, the distribution density of the first support structures 3 in the display area 101 is the same as the distribution density of the second support structures 5 in the frame area 102, and with this arrangement, the supporting strength of the second support structures 5 to the color filter substrate 9 and the array substrate 13 in the frame area 102 is substantially the same as the supporting strength of the first support structures 3 to the color filter substrate 9 and the array substrate 13 in the display area 101, thereby reducing or avoiding the seesaw effect occurring in the vacuum assembly and cutting of the color filter substrate 9 and the array substrate 13, and reducing or eliminating an influence caused by a difference in cell gap between the display area 101 and the frame area 102 of the color filter substrate 9 and the array substrate 13 that are assembled.

In some embodiments, the substrate 1 further includes a to-be-cut area 103, the to-be-cut area 103 is disposed on a side of the frame area 102 away from the display area 101, and the to-be-cut area 103 is located on at least one side of the display panel. The color filter substrate 9 further includes a third film structure 7 and a third auxiliary support part 8 that are arranged in the to-be-cut area 103, and the third film structure 7 and the third auxiliary support part 8 are sequentially stacked on the substrate 1. The third film structure 7 includes a third black matrix 213 and a third color resist layer 603, and the third black matrix 213 and the third color resist layer 603 are sequentially stacked in the direction away from the substrate 1. The third black matrix 213 and the first black matrix 211 are made of the same material and arranged in a same layer, and the third black matrix 213 and the first black matrix 211 have the same thickness. The third color resist layer 603 is arranged in the same layer as the first color resist layer 601. In some embodiments, the array substrate 13 further includes a third surface layer 133 opposite to the third auxiliary support part 8, and the third auxiliary support 8 is not in contact with the third surface layer 133. In some embodiments, the third color resist layer 603 has the same thickness as the first color resist layer 601, and the third auxiliary support part 8 has the same thickness as the first auxiliary support part 32. The to-be-cut area 103 of the color filter substrate 9 is removed by cutting after the color filter substrate 9 and the array substrate 13 are assembled, so as to expose the bonding area on the array substrate 13. With this arrangement, a seesaw effect occurring in the case of vacuum assembly and cutting of the color filter substrate 9 and the array substrate 13 can be alleviated or avoided, display defects of the display panel are further alleviated or avoided, and the display effect of the display panel is improved. The liquid crystal display panel with the to-be-cut area 103 removed is as shown in FIG. 3b.

For a conventional liquid crystal display panel, variations of the cell gaps between the color filter substrate and the array substrate in the upper, lower, left, and right edge regions of the liquid crystal display panel are large, as shown in FIG. 7 (in which cell gaps at positions, along a direction extending from a boundary between the to-be-cut area 103 and the frame area 102 to the display area 101, in each of the upper, lower, left, and right edge regions of the liquid crystal display panel are shown); the difference between the maximum value and the minimum value of the cell gap between the color filter substrate and the array substrate in each of the upper, lower, left, and right edge regions of the liquid crystal display panel is large, as shown in FIG. 8. According to the liquid crystal display panel of the embodiments of the present disclosure, the variation of the cell gap between the color filter substrate and the array substrate in each of the upper, lower, left, and right edge regions of the liquid crystal display panel (in the frame area 102 of the liquid crystal display panel) is reduced, as shown in FIG. 9 (in which cell gaps at positions, along a direction extending from a boundary between the to-be-cut area 103 and the frame area 102 to the display area 101, in each of the upper, lower, left, and right edge regions of the liquid crystal display panel are shown); the difference between the maximum value and the minimum value of the cell gap between the color filter substrate and the array substrate in each of the upper, lower, left, and right edge regions of the liquid crystal display panel is significantly reduced, as shown in FIG. 10.

In another aspect, the embodiments also provide a manufacturing method of a display panel, the display panel is the display panel provided by the embodiments of the present disclosure and includes a display area and a frame area surrounding the display area, and the manufacturing method includes manufacturing an array substrate and a color filter substrate separately; and assembling the array substrate and the color filter substrate. Manufacturing the color filter substrate includes forming a first support structure and a second support structure on a substrate, the first support structure and the second support structure being formed on a side of the substrate close to the array substrate; the first support structure is positioned in the display area, and the second support structure is positioned in the frame area; at least a part of the first support structure is in contact with the array substrate, and at least a part of the second support structure is in contact with the array substrate.

According to the manufacturing method of the color filter substrate, by making at least a part of the second support structure contact with the array substrate, the support from the second support structure to the color filter substrate and the array substrate in the frame area is basically consistent with the support from the first support structure to the color filter substrate and the array substrate in the display area, so that a seesaw effect generated during the vacuum assembly and cutting of the color filter substrate and the array substrate is alleviated or avoided, the influence caused by a difference in cell gap between the display area and the frame area of the color filter substrate and the array substrate that are assembled is reduced or avoided, and the display defect of the display panel is further alleviated or avoided; furthermore, steps of the manufacturing process of the display panel are not additionally increased, and the manufacturing process of the display panel is simplified.

In some embodiments, manufacturing the color filter substrate further includes forming a first film structure and a second film structure, the first film structure being located in the display area, and the first film structure being formed on the substrate before the first support structure is formed; the second film structure being located in the frame area, and the second film structure being formed on the substrate before the second support structure is formed. Forming the first film structure includes sequentially forming a first black matrix and a first color resist layer on the substrate, the first black matrix and the first color resist layer being sequentially stacked in a direction away from the substrate. Forming the second film structure includes sequentially forming a second black matrix and a second color resist layer on the substrate, the second black matrix and the second color resist layer being sequentially stacked in the direction away from the substrate. The first black matrix and the second black matrix may be formed by a same photolithography process. A same coating process may be adopted to form color resists of a same color of the first color resist layer and the second color resist layer, and in this case, the thickness of the formed second color resist layer is larger than the thickness of the formed first color resist layer.

In some embodiments, forming the first support structure includes forming a first main support part and a first auxiliary support part; the first main support part and the first auxiliary support part are both arranged on a surface of the first color resist layer away from the substrate; the first main support part is in contact with a first surface layer of the array substrate, and the first auxiliary support part is opposite to the first surface layer of the array substrate with a first gap therebetween. Forming the second support structure includes forming a second main support part and a second auxiliary support part; the second main support part and the second auxiliary support part are both arranged on a surface of the second color resist layer away from the substrate; the second main support part is in contact with a second surface layer of the array substrate, and the second auxiliary support part is opposite to the second surface layer of the array substrate with the first gap therebetween. The first main support part, the first auxiliary support part, the second main support part, and the second auxiliary support part may be formed through a single exposure process using a half-tone mask.

In some embodiments, to compensate for the difference between the thickness of the color resist layer in the display area and the thickness of the color resist layer in the frame area, the second main support part in the frame area has a different thickness from the first main support part in the display area, and the second auxiliary support part in the frame area has a different thickness from the first auxiliary support part in the display area. When the first support structure and the second support structure are formed, the difference in thickness between the first support structure and the second support structure is achieved by controlling the transmittance of exposure light using a half-tone mask, and finally the support of the second support structure to the color filter substrate and the array substrate in the frame area and the support of the first support structure to the color filter substrate and the array substrate in the display area are basically consistent. Therefore, a seesaw effect occurring in the case of vacuum assembly and cutting of the color filter substrate and the array substrate can be alleviated or avoided, the influence caused by the difference in cell gap between the display area and the frame area of the color filter substrate and the array substrate that are assembled is reduced or avoided, display defects of the display panel are further alleviated or avoided, and the display effect of the display panel is improved.

It should be noted that the second support structure and the first support structure may also be formed by multiple exposure processes, which are not described herein.

In some embodiments, after the array substrate and the color filter substrate are assembled, the manufacturing method of the display panel further includes cutting and removing the to-be-cut area on the color filter substrate, and reserving the to-be-cut area on the array substrate. When the to-be-cut area on the color filter substrate is cut, the to-be-cut area is cut along the boundary line between the to-be-cut area and the frame area, so that the bonding area on the array substrate is exposed.

Figure 4A:
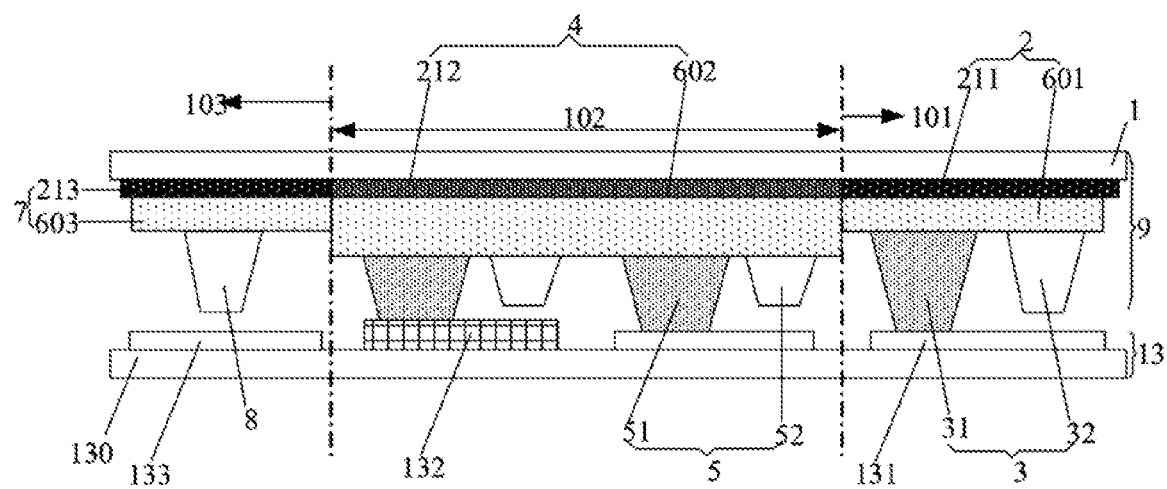
FIG. 4a is a schematic cross-sectional view of a structure of another display panel according to an embodiment of the present disclosure.
Figure 4B:
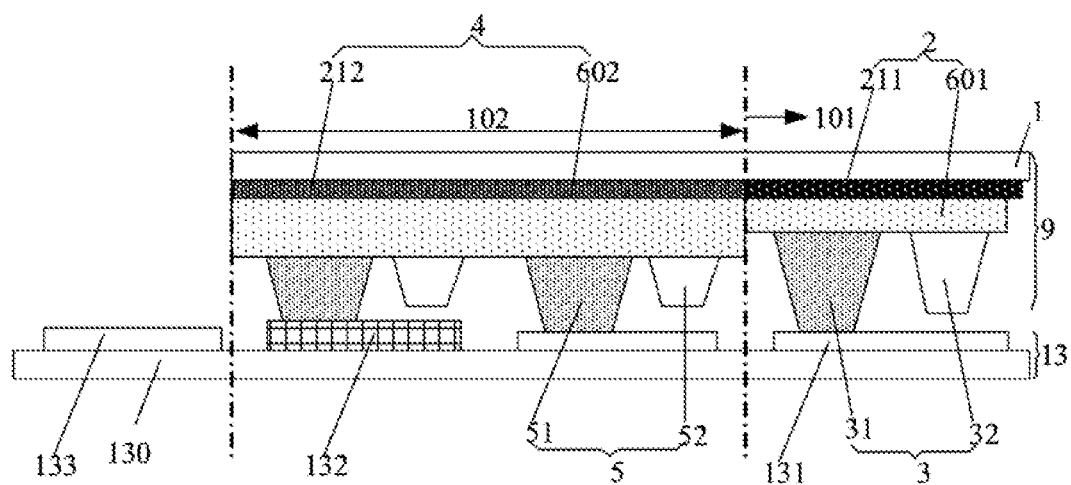
FIG. 4b is a schematic cross-sectional view of a structure of the display panel in FIG. 4a after a to-be-cut area on a color filter substrate is cut.

The embodiments of the present disclosure further provide a display panel. As shown in FIGS. 4a and 4b, the thicknesses of the first black matrix 211 and the second black matrix 212 are the same, and the thickness of the second color resist layer 602 is greater than that of the first color resist layer 601. In some embodiments, at least one second surface layer 132 in contact with the second main support part 51 (e.g., the second surface layer 132, which is farthest from the display area 101, in the frame area 102) in the frame area 102 has a height greater than the height of the first surface layer 131 in contact with the first main support part 31 in the display area 101. In this case, there is a first difference in height between each of the at least one second surface layer 132 in contact with the second main support part 51 and the first surface layer 131 in contact with the first main support part 31. The second main support part 51 in contact with each of the at least one second surface layer 132 has a height less than the height of the first main support part 31. In addition, the second auxiliary support part 52 opposite to each of the at least one second surface layer 132 may have a height less than that of the first auxiliary support part 32. With this arrangement, the first difference in height and the difference in thickness between the second color resist layer 602 and the first color resist layer 601 can be partially or completely compensated for, a seesaw effect occurring in the case of vacuum assembly and cutting of the color filter substrate 9 and the array substrate 13 is alleviated or avoided, the influence caused by the difference in cell gap between the display area 101 and the frame area 102 of the color filter substrate 9 and the array substrate 13 that are assembled is avoided, display defects of the display panel are further alleviated or avoided, and the display effect of the display panel is improved.

In some embodiments, the difference in thickness between the second main support part 51 in contact with each of the at least one second surface layer 132 and the first main support part 31 is equal to the sum of the difference in thickness between the second color resist layer 602 and the first color resist layer 601 and the first difference in height. In addition, the difference in thickness between the second auxiliary support part 52 opposite to each of the at least one second surface layer 132 and the first auxiliary support part 32 may be equal to the sum of the difference in thickness between the second color resist layer 602 and the first color resist layer 601 and the first difference in height. With this arrangement, the first difference in height and the difference in thickness between the second color resist layer 602 and the first color resist layer 601 can be completely compensated for, so that it is ensured the cell gaps between the display area 101 and the frame area 102 of the color filter substrate 9 and the array substrate 13 that are assembled are consistent, a seesaw effect occurring in the case of vacuum assembly and cutting of the color filter substrate 9 and the array substrate 13 is further avoided, and an influence caused by the difference in cell gap between the display area 101 and the frame area 102 of the color filter substrate 9 and the array substrate 13 that are assembled is eliminated.

Other structures of the display panel in the embodiment are the same as those in the above embodiments, and are not described herein again.

FIG. 4 shows only a case where only some of the second surface layers 132 in the frame area 102 have a thickness greater than the thickness of the first surface layer 131 in the display area 101, and the other second surface layer(s) 132 have(has) a thickness equal to the thickness of the first surface layer 131 in the display area 101, but the present disclosure is not limited thereto, and the height of each second surface layer 132 in the frame area 102 may be greater than the thickness of the first surface layer 131 in the display area 101. In this case, the height of each second surface layer 132 in the frame area 102 may be the same. Of course, it can be understood that the first surface layers 131 in the display area 101 may have the same thickness.

According to the above-described structure of the display panel, the embodiments further provide a method for manufacturing a display panel, which is substantially the same as the method for manufacturing the display panel in the foregoing embodiments; in order to compensate for the difference in thickness between the color resist layer in the display area and the color resist layer in the frame area and the difference in height between the film layers on the array substrate, which are in contact with or corresponds to the first support structure and the second support structure, respectively, there is a step difference between the second main support part in the frame area and the first main support part in the display area, and there is a step difference between the second auxiliary support part in the frame area and the first auxiliary support part in the display area. When the first support structure and the second support structure are formed, the transmittance of exposure light is controlled by adopting a half-tone mask to realize the step difference between the first support structure and the second support structure, and finally the support of the second support structure to the color filter substrate and the array substrate in the frame area and the support of the first support structure to the color filter substrate and the array substrate in the display area are substantially consistent, so that a seesaw effect occurring in the case of the vacuum assembly and cutting of the color filter substrate and the array substrate is alleviated or avoided, the influence caused by the difference in cell gap between the display area and the frame area of the color filter substrate and the array substrate that are assembled is reduced or eliminated, display defects of the display panel are reduced or avoided, and the display effect of the display panel is improved.

The manufacturing process of the display panel in the embodiment is not described in detail.

According to the display panel provided by the embodiments of the present disclosure, by making at least a part of the second support structure contact with the array substrate, the supporting condition of the second support structure on the color filter substrate and the array substrate in the frame area is basically consistent with the supporting condition of the first support structure on the color filter substrate and the array substrate in the display area, so that a seesaw effect generated during the vacuum assembly and cutting of the color filter substrate and the array substrate is alleviated or avoided, the influence caused by a difference in cell gap between the display area and the frame area of the color filter substrate and the array substrate that are assembled is reduced or avoided, the display defect of the display panel is further alleviated or avoided, and the display effect of the display panel is improved.

It can be understood that although there is a difference in thickness between the first color resist layer 601 in the display area 101 and the second color resist layer 602 in the frame area 102 in some embodiments of the present disclosure, the present disclosure is not limited thereto. It is only required that both the first main support part 31 and the second main support part 51 are in contact with the array substrate 13 (the first surface layer 131 or the second surface layer 132), for example, the sum of the thicknesses of the first black matrix 211, the first color resist layer 601, the first main support part 31, and the first surface layer 131 in the display area 101 is substantially equal to the sum of the thicknesses of the second black matrix 212, the second color resist layer 602, the second main support part 51, and the second surface layer 132 in the frame area 102.

Embodiments of the present disclosure further provide a display device, including the display panel in any of the above embodiments.

By adopting the display panel in the above embodiments, a seesaw effect occurring during the vacuum assembly and cutting of the display device can be alleviated or avoided, the influence caused by a difference in cell gap between the display area and the frame area of the display device is reduced or avoided, the display defect of the display device is alleviated or avoided, and the display effect of the display panel is improved.

The display device according to the embodiments of the present disclosure may be any product or component with a display function, such as an LCD panel, an LCD television, a display, a mobile phone, a navigator or the like.

It could be understood that the above embodiments are merely exemplary embodiments adopted to illustrate the principles of the present disclosure, and the present disclosure is not limited thereto. For those of ordinary skill in the art, various modifications and improvements can be made without departing from the spirit and essence of the present disclosure, and these modifications and improvements are also deemed to be within the protection scope of the present disclosure.

What is claimed is:

1. A display panel, comprising a display area and a frame area surrounding the display area, wherein the display panel comprises an array substrate and a color filter substrate opposite to each other, the color filter substrate comprises a substrate and a plurality of first support structures and a plurality of second support structures both disposed on a side of the substrate close to the array substrate, the plurality of first support structures are in the display area, and the plurality of second support structures are in the frame area; each of the plurality of first support structures comprises a first main support part and a first auxiliary support part, the first main support part is in contact with the array substrate, and there is a first gap between the first auxiliary support part and the array substrate; each of the plurality of second support structures comprises a second main support part and a second auxiliary support part, the second main support part is in contact with the array substrate, and there is a second gap between the second auxiliary support part and the array substrate; and a thickness of the first auxiliary support part is greater than a thickness of the second auxiliary support part.

2. The display panel of claim 1, wherein a difference in thickness between the first main support part and the first auxiliary support part ranges from 0.45 μm to 0.55 μm; and a difference in thickness between the second main support part and the second auxiliary support part ranges from 0.45 μm to 0.55 μm.

3. The display panel of claim 1, wherein the color filter substrate further comprises a first film structure and a second film structure, the first film structure is in the display area and between the substrate and the plurality of first support structures; the second film structure is in the frame area and between the substrate and the plurality of second support structures;
   the first film structure comprises a first black matrix and a first color resist layer, and the first black matrix and the first color resist layer are sequentially stacked in a direction away from the substrate;
   the second film structure comprises a second black matrix and a second color resist layer, and the second black matrix and the second color resist layer are sequentially stacked in the direction away from the substrate; and
   the first black matrix and the second black matrix are made of a same material and arranged in a same layer, and the first color resist layer and the second color resist layer are arranged in a same layer.

4. The display panel of claim 3, wherein the first main support part and the first auxiliary support part are both arranged on a surface of the first color resist layer away from the substrate;
   the first main support part is in contact with a first surface layer of the array substrate, and the first auxiliary support part is opposite to the first surface layer of the array substrate with the first gap therebetween;
   the second main support part and the second auxiliary support part are both arranged on a surface of the second color resist layer away from the substrate; and
   the second main support part is in contact with a second surface layer of the array substrate, and the second auxiliary support part is opposite to the second surface layer of the array substrate with the second gap therebetween.

5. The display panel of claim 4, wherein the first black matrix and the second black matrix have a same thickness.

6. The display panel of claim 5, wherein a portion of the first surface layer in contact with the first main support part and a portion of the second surface layer in contact with the second main support part have a same height.

7. The display panel of claim 6, wherein a difference between thicknesses of the first main support part and the second main support part is equal to a difference between the thicknesses of the second color resist layer and the first color resist layer.

8. The display panel of claim 7, wherein a difference between thicknesses of the first auxiliary support part and the second auxiliary support part is equal to the difference between the thicknesses of the second color resist layer and the first color resist layer.

9. The display panel of claim 5, wherein only a part of the second surface layers respectively in contact with the plurality of second main support parts has a height greater than a height of the first surface layer in contact with the first main support part.

10. The display panel of claim 9, wherein the second main support part of at least one second support structure in contact with the part of the second surface layers has a thickness smaller than a thickness of the second main support part of other second support structure in the frame area.

11. The display panel of claim 9, wherein the second auxiliary support part of at least one second support structure in contact with the part of the second surface layers has a thickness smaller than a thickness of the second auxiliary support part of other second support structure in the frame area.

12. The display panel of claim 9, wherein there is a first difference in height between the part of the second surface layers and the first surface layer; a difference in thickness between the first main support part and each second main support part in contact with one of the part of the second surface layers is equal to a sum of a difference in thickness between the second color resist layer and the first color resist layer and the first difference in height.

13. The display panel of claim 11, wherein a difference in thickness between the first auxiliary support part and each second auxiliary support part opposite to one of the part of the second surface layers is equal to the sum of the difference in thickness between the second color resist layer and the first color resist layer and the first difference in height.

14. The display panel of claim 4, wherein a height of the second surface layer is greater than a height of the first surface layer.

15. The display panel of claim 14, wherein there is a first difference in height between the second surface layer and the first surface layer; a difference in thickness between the second main support part and the first main support part is equal to a sum of a difference in thickness between the second color resist layer and the first color resist layer and the first difference in height.

16. The display panel of claim 15, wherein a difference in thickness between the second auxiliary support part and the first auxiliary support part is equal to the sum of the difference in thickness between the second color resist layer and the first color resist layer and the first difference in height.

17. The display panel of claim 4, wherein the first main support parts and the second main support parts have a same distribution density; and/or the first auxiliary support parts and the second auxiliary support parts have a same distribution density.

18. The display panel of claim 1, wherein the first gap is equal to the second gap.

19. A display device, comprising the display panel of claim 1.

20. A manufacturing method of a display panel, wherein the display panel comprises a display area and a frame area surrounding the display area, the manufacturing method comprises manufacturing an array substrate and a color filter substrate separately, and assembling the array substrate and the color filter substrate;

wherein manufacturing the color filter substrate comprises: forming a plurality of first support structures and a plurality of second support structures on a side of a substrate close to the array substrate; the plurality of first support structures are located in the display area, and the plurality of second support structures are located in the frame area; each of the plurality of first support structures comprises a first main support part and a first auxiliary support part, the first main support part is in contact with the array substrate, and there is a first gap between the first auxiliary support part and the array substrate; each of the plurality of second support structures comprises a second main support part and a second auxiliary support part, the second main support part is in contact with the array substrate, and there is a second gap between the second auxiliary support part and the array substrate; and a thickness of the first auxiliary support part is greater than a thickness of the second auxiliary support part.

* * * * *